United States Patent [19]

Postman

[11] Patent Number: 5,019,697

[45] Date of Patent: May 28, 1991

[54] DATA COLLECTION SYSTEM USING MEMORY CARD

[75] Inventor: Joel R. Postman, Santa Clara, Calif.

[73] Assignee: TPS Electronics, Palo Alto, Calif.

[21] Appl. No.: 356,517

[22] Filed: May 25, 1989

[51] Int. Cl.⁵ .............................................. G06K 7/06
[52] U.S. Cl. .................................. 235/441; 235/440; 235/492
[58] Field of Search ............... 235/435, 440, 441, 492, 235/379, 380, 382, 441

[56] References Cited

U.S. PATENT DOCUMENTS

| | | | |
|---|---|---|---|
| 4,023,013 | 5/1977 | Kinker | 235/379 |
| 4,634,846 | 1/1987 | Harvey et al. | 235/435 X |
| 4,797,540 | 1/1989 | Kimizu | 235/379 X |
| 4,827,113 | 5/1989 | Rikuna | 235/441 X |

OTHER PUBLICATIONS

IBM Personal Computer Technical Reference Manual, pp. D-10, D-12, D-13; 1981.

Primary Examiner—David Trafton
Attorney, Agent, or Firm—N. Kallman

[57] ABSTRACT

A data collection system useful for trade shows employs identification cards each having a semiconductor memory chip for recording and storing data relating to individual attendees. The system includes an encoder/decoder that is coupled between a keyboard and a computer. The encoder/decoder accepts the memory cards for recording the data generated at the keyboard and for reading the recorded data at a later time.

6 Claims, 1 Drawing Sheet

DATA COLLECTION SYSTEM USING MEMORY CARD

FIELD OF THE INVENTION

This invention relates to a data collection system and in particular to the use of a memory card for identification and data collection.

BACKGROUND OF THE INVENTION

Description of the Prior Art

At trade shows and conventions, it has been common practice to issue identification cards to attendees who register and pay an admission fee. The identification card is used to collect, record and disseminate detailed information about the person to whom the card has been issued. In addition, identification cards are issued to the exhibitors, members of the press, and invited speakers, among others.

The badges are used for security purposes and for differentiating between paid attendees, exhibitors, the show management and service personnel, the press and other types of persons or groups that attend the show. To this end, the badges may have various identifying colors, different graphic designs, or other indicia. The badges may also reflect the particular days that a cardholder may attend the show. At the show, the badges are useful to the exhibitors to identify the company association of the individual visiting a booth, the person's title, and other information of interest.

An important use of the badge is to give the exhibitors as well as the show producers an opportunity to collect and record a list of the attendees, names, addresses, telephone numbers and other data that would enable followup by telephone or direct mailing of sales material. Previously the data were gathered by obtaining individual business cards, or if the attendee did not have a business card, then it would be necessary to have him write the information on paper. In some cases, the handwritten names or addresses were too illegible to be of any use. Since an exhibitor invests a significant amount of money to promote the products being displayed at the show, these prior approaches were not acceptable.

As a result, different types of identification badges have been developed to minimize the problems associated with the business card approach. One type of card encompasses data readable by the human eye which can be imprinted by a dot-matrix, thermal, laser or impact printer, for example. The imprinting may be formed directly on the card or on a label that is then attached to the card.

A second type of card uses a magnetic stripe or bar code which are readable by sensing devices. However the stripe or bar code cards are limited in size and data storage, and the technology involved does not allow a desired complete profile of the attendee. Generally with this type of card only an identification number is registered that is referenced to a number in a database stored in the proprietary computer of the show's management. Access to this computer is not available to the exhibitors. The show management controls the database to ensure data integrity and to keep the contents confidential. The show management uses the database to sell lists including information to advertisers after the show has closed. The machine-readable data can be stored for later use, printed or displayed on a video screen for editing or review.

Another approach to identification cards or badges is the use of optical character recognition (OCR) with embossed plastic cards. In such case, the card is readable by the human eye and also can be read by a machine. The characters embossed on the card can be scanned by a hand-held scanner and the data can be transmitted to a data processor or computer. These plastic cards are generally similar in size, shape and material to the widely used credit cards. However embossing of the data requires a number of machines of the size of home refrigerators. The cards can be embossed off-site and then mailed or distributed to the attendees at the show at a "will call" table. In such event, a major bottleneck occurs, particularly where there are thousands of attendees to service, so that the attendees must spend a long time on line to receive their badges. Also, the embossed card is limited to a small number of characters that can be recorded due to the size of the card or badge. Since the embossed characters need to be human-readable and the badge is of a limited standard size and can be printed for reading on only one side, the usual limitation is 100 to 200 characters per badge. In many cases it is necessary to abbreviate certain words, which may lead to errors in interpretation of attendee data.

After a badge or card has been embossed, it is generally placed in a plastic holder having a pin so that the badgeholder can wear the badge to gain entry to the show and during attendance at the show. However when the attendee is at an exhibitor's booth in which there is interest in the products of the exhibitor, the plastic badge is usually removed from the plastic holder to be imprinted on a machine that will provide a physical record of the attendee's data. The device used for imprintinq is similar to the type used for imprinting credit cards, which requires a paper slip with a carbon copy form. To effectuate the imprinting, a manually operated hand roller is pulled back and forth over the card and the paper slip and carbon form. The raised letters on the embossed card enable the imprinting of the data from the card. It is apparent that the imprinting mechanism is subject to wear, and that the embossed card may be worn smooth so that the imprinting may not be effectively accomplished. If the form is not properly aligned, the imprinted data may not be readable.

Another problem with the plastic card is that it is not correctable. Thus if an error is made in recording any data, the badge is discarded and a corrected badge prepared. If not, the error must be corrected by each person or company that receives the erroneous data registered on the badge.

Another problem that is encountered with the embossed badge is the requirement that the information recorded on the badge needs to be manually typed onto mailing labels or separately keyed into a computer for processing whenever an exhibitor wishes to mail sales material to attendees who have expressed an interest in the products of the exhibitor. Obviously this becomes an expensive, time-consuming job. Also mailing labels that are prepared by typing may be illegible or contain errors in the names or addresses.

In view of the problems associated with embossed cards, bar code, magnetic stripe and computer networking technologies are increasingly being used. Systems for transferring and storing data using portable electronic devices in the form of flat cards in which logic microstructures are encapsulated are known in the prior art. Reference is made to U.S. Pat. Nos. 4,007,355, 4,404,464, 4,102,493, and 3,971,916 which describe such data transfer and storage systems. A convention badge that provides a combination of machine and visually readable cards is described in U.S Pat. No. 4,509,277.

Some card systems use bar codes that are formed by a series of bars and spaces in a standardized format that can be decoded into ASCII data having alphanumeric characters by a compatible bar code scanning device. However due to space limitations, which are imposed because bar codes generally can encode only 12 characters per inch for most systems in current use, the bar code is usually used as an identifying number only. Since about 150-200 characters are generally required for an attendee profile, it is not practical to encode all of the attendee data on a single badge in a bar code format. Therefore a number is assigned to an attendee, and when a person registers for a show, a badge with a bar code label referenced to that number is used, having only a minimal amount of information in addition on the card. The assigned number can then be linked in the database of the show management to a detailed profile of the attendee. However, the exhibitor would not be content merely with the number identification of attendees and thus would resort to collecting business cards from attendees thereby negating the advantages of the bar code identification badge. In addition if the show management collects the bar code information and maintains the data as proprietary, and uses nonstandard equipment for the recording, then the exhibitor is required to rely on the show management to provide reports, mailing labels and the like. The show registration company for a fee would then convert the recorded data into a usable format for providing to the exhibitors or mail order firms the desired materials.

Magnetic stripe technology is used in a similar manner to the bar code. A magnetic stripe badge allows the correction of errors using an encoder that accepts keystrokes from a keyboard. But the same problems of proprietary recording and storage by the show management, and the limitation of the storage capacity of the magnetic stripe badge still exist. A reference number needs to be assigned to each attendee.

Another approach to data collection and recording that may be used at trade shows is the use of computer networks. This would require that each exhibitor booth have one or more computer terminals equipped that would be connected to a central database of badgeholder profiles. This would necessitate an encrypted password in the bar code or magnetic stripe to prevent access to unauthorized persons. Erroneous information could be corrected and the data updated by an authorized terminal having read/write capability and the ability to modify the database. With such a system, the exhibitors would need computers or terminals that are compatible with the network. Also the administrative task of networking the very large number of exhibitors at a show is difficult, time-consuming and expensive.

SUMMARY OF THE INVENTION

An object of this invention is to provide a data collection system using an identification card which eliminates the need for a computer network.

Another object of this invention is to provide a data collection system which allows the storage and transfer of data for recording a large number of alphanumeric characters.

Another object is to provide a data collection system that affords facile correction of data recorded on an identification badge and in the data stored in a data processor.

Another object is to provide a data collection system which uses an identification card that is reusable and rerecordable.

Another object is to provide a low-cost, easily interfaced system, with a nonproprietary recording scheme for reading and writing data.

In accordance with this invention, a data collection system which accepts identification cards for recording, storing and processing data comprises an encoder/decoder circuit that is coupled to a keyboard of a personal computer and which interfaces a data processing unit or computer. The identification cards are formed with semiconductor memory chips having logic circuitry. The memory chips include conductive elements associated with the logic circuitry which contact conductive lines or terminals of the encoder/decoder. As an alternative, the memory chip of the card can be inductively coupled to the circuitry of the encoder/decoder.

In the recording or write mode, data is entered through the keyboard to the computer. The computer stores and processes the data and formats the data for transmission to the memory chip using the RS-232 communication port or its equivalent. The formatted data is recorded or written in the memory of the chip. When the card with the written data is inserted in the slot associated with the encoder/decoder for readout of the data, the decoder translates the formatted data into signals which are serially passed through the keyboard interface to the computer. The encoder/decoder allows data to be received, transmitted and processed by most microcomputer software programs. The data encoded on the identification card can be decoded and transmitted to a serial printer, having an RS232 port for example, which enables verification of the encoded data and affords on-demand label printing and record printing.

DESCRIPTION OF THE DRAWING

The invention will be described in greater detail with reference to the drawing in which.

DETAILED DESCRIPTION OF THE INVENTION

Figure 1:
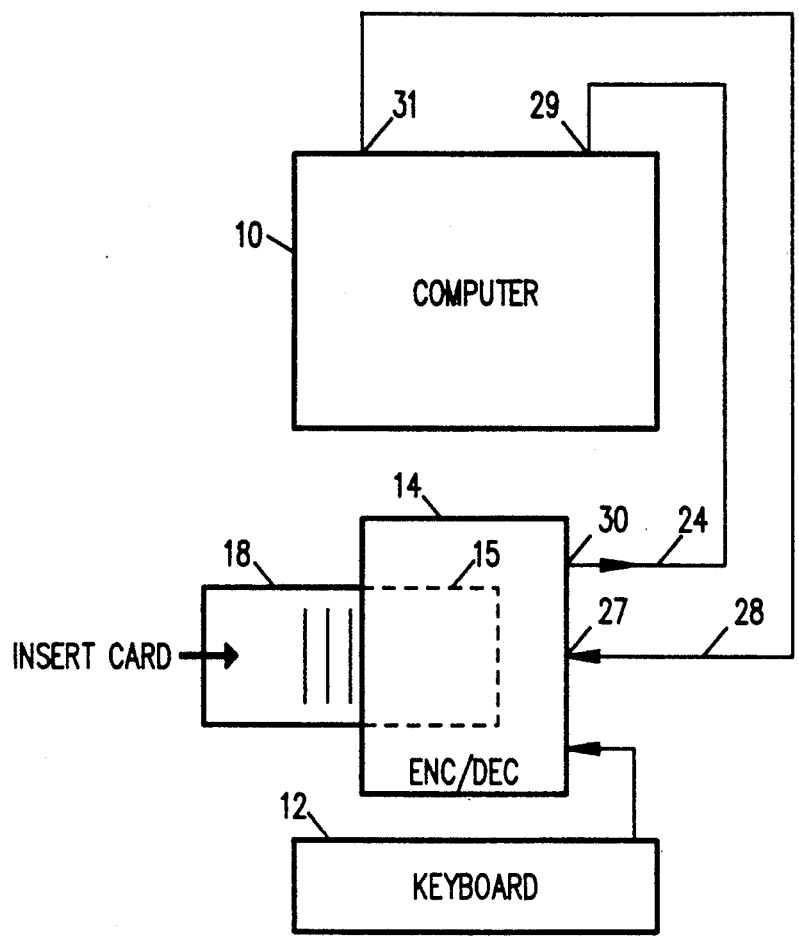
FIG. 1 is a block circuit diagram of the data collection made in accordance with this invention.
Figure 2:
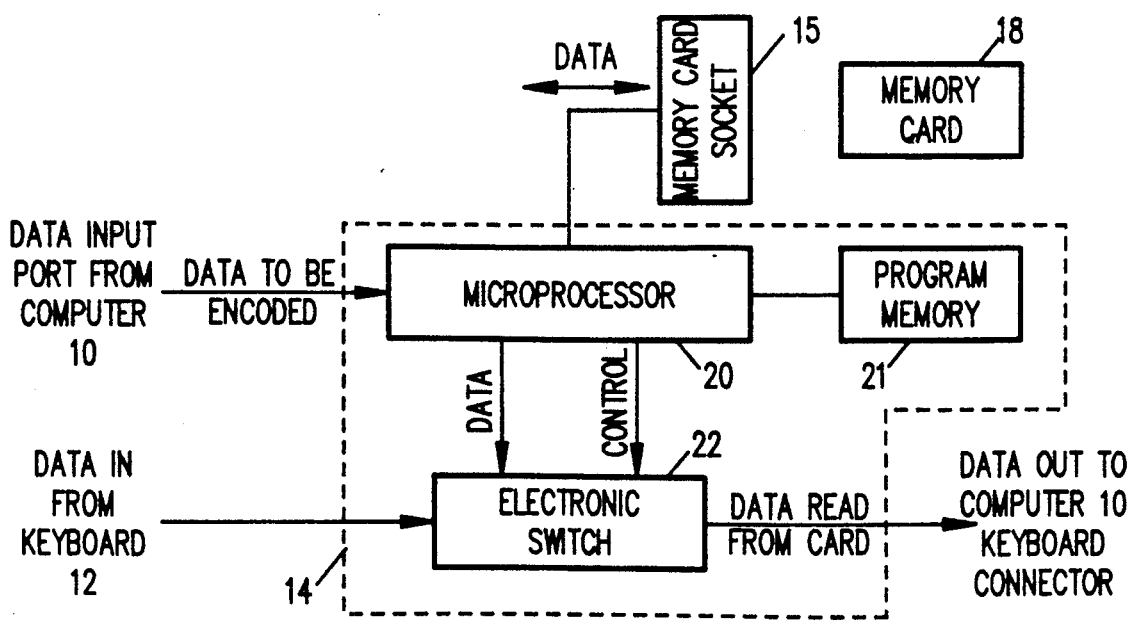
FIG. 2 is a block circuit diagram illustrating the encoder/decoder circuit of the data collection system.

With reference to the drawing, a data collection system includes a data processor 10, which preferably is a personal computer for example. A keyboard 12 associated with the computer is provided to enter data by an operator into the computer as is well known in the art. In keeping with the invention, an encoder/decoder circuit 14 is provided to interface with the computer 10 and to interact with a memory card 18. The memory card, which may be of the type known as the SMART (trademark of Innovatron) card, incorporates an integrated circuit memory chip. The semiconductor memory chip contains memory cells and a shift register which enable the storage and handling of data serially for example.

The encoder/decoder includes a microprocessor 20 which can be controlled by a program in the memory 21. The encoder/decoder also includes a dynamic multipole, double throw switch 22 which is controlled by the programmed microprocessor. In one switch position, the data signal from the keyboard 12 is directed to the computer 10 from an output connector 30 along lead 24 to a keyboard socket 29 of the computer. In a second position, the switch 22 allows the flow of serial data stored in the memory card to be directed to the keyboard socket 29 Data from the computer memory is directed from a serial port 31 of the computer along line 28 to the encoder/decoder.

The encoder /decoder is contained in a housing having a socket 15 for accepting the memory card for recording data thereon and for readout of the recorded data. The memory card has conductive or inductive elements coupled to the circuitry of the IC chip embedded in the card. The conductive elements are exposed on the card and are accessible for connection to terminals of the encoder/decoder circuit, or alternatively an inductive element of the encoder /decoder couples the data.

When the data collection system is operative, the memory card is inserted in the socket 15. The keyboard is operated to provide data signals representing alphanumeric characters to the computer. The computer stores the data for future use. The computer is directed to feed the data to the encoder/decoder which operates to encode the data signal. The microprocessor 20 receives the data to be encoded and under commands from the program in the memory 21 processes the data. The processed data which has been encoded is applied to the memory chip for storage in the memory cells of the semiconductor.

When it is desired to retrieve the data that was recorded on the card, the card is inserted in the socket 15 so that electrical connection is made between the IC chip circuit and the encoder/decoder terminals. The data that is recorded in the memory cells of the semiconductor chip is decoded by the microprocessor of the decoder. The data that is read out from the card is fed to the computer for viewing or printout by an accessory printer or for editing if necessary.

Since individual characters can be transmitted to the card by the encoder, the card can be encoded at the same time as the data for the card is being typed into the microcomputer. Improperly typed characters can be replaced one at a time or the entire card can be erased and rerecorded.

The decoding and reading portion of the system is implemented by way of the keyboard interface of the computer. The data from the card is translated into the form of ordinary letters and numbers as generated by the keyboard of the microcomputer. This frees the user from having to understand or translate some proprietary encoding scheme. The encoder/decoder will allow data to be easily transmitted to almost any microcomputer software program.

Data from the card can also be optionally decoded and transmitted to a serial (RS-232) interface printer for purposes of verification, on-demand label printing and record-keeping.

In one implementation of the invention the encoder/decoder was 6.0" wide by 5.0" deep by 3.0" tall. The unit weighed 2 lbs. Externally the unit is constructed entirely of metal components, and does not require any separate power supply.

In order for the badge to fulfill the dual purpose role of electronic identification as well as visual identification, it can be fitted with a removable paper label with visually readable characters identifying the cardholder.

This removable label is made of a paper and adhesive which ensures that it does not accidentally fall off or peel off, but that it can be removed easily at the end of a show to facilitate the process of reusing the card for future shows.

The removable label is generated by any printing process such as impact, dot-matrix, thermal, laser, ion deposition, photo-offset or photo composition.

There has been described herein a data processing system for use with an identification card having a semiconductor memory. An encoder/decoder provides a direct interface between a keyboard circuit and the keyboard socket of a computer. The system provides direct access to any computer program and conventional computer operation is used to format and store data. The stored data is written on the card and subsequently can be read out with an existing computer program. The data from the card is translated into the form of ordinary letters and numbers as generated by the keyboard of the computer. This frees the user from having to understand or translate a proprietary encoding scheme. There is no need to modify a program for receiving and accepting an RS232 input, as is found necessary with prior known systems.

What is claimed is:

1. A data collection system for processing and storing information that is recorded electrically on an identification card having a semiconductor memory chip embedded therein comprising:
    a data processor having an input terminal for receiving data;
    a keyboard for generating a data signal in response to actuation by an operator;
    an encoder/decoder circuit coupled to the output of said keyboard for receiving said generated data signal, said encoder/decoder circuit having an interface for coupling said circuit to said data processor input terminal;
    means formed with said encoder/decoder circuit for receiving said identification card so that electrical connection is made between said memory chip and said encoder/decoder circuit.

2. A data collection system as in claim 1, wherein said encoder/decoder circuit comprises an electronic switch for controlling the flow of data signal between said data processor and said encoder/decoder.

3. A data collection system as in claim 2, wherein said electronic switch is a dynamic multipole, double throw switch.

4. A data collection system as in claim 1, wherein said encoder/decoder circuit comprises a microprocessor for encoding data received from said processor and for decoding data recorded on said card.

5. A data collection system as in claim 4, wherein said encoder/decoder circuit includes a program memory for controlling the operation of said microprocessor.

6. An encoder/decoder circuit for providing an interface between a keyboard and a computer having a keyboard connector comprising;
    a microprocessor coupled to said computer for receiving data formatted by said computer and for encoding and decoding said formatted data that is stored on a memory card;
    a socket for accepting said memory card coupled to said encoder/decoder circuit;
    an electronic switch for directing data signals from said keyboard to said keyboard connector;

said microprocessor being connected to said electronic switch for controlling the functioning of said switch, said microprocessor being connected to said memory socket for transfer of data signals to and from said memory card; and a program memory coupled to said microprocessor for controlling the operation of said microprocessor.

* * * * *